(12) United States Patent
Jan

(10) Patent No.: US 10,539,282 B2
(45) Date of Patent: Jan. 21, 2020

(54) LIGHTING LAMP DEVICE

(71) Applicant: Sung Won Jan, Daegu (KR)

(72) Inventor: Sung Won Jan, Daegu (KR)

( * ) Notice: Subject to any disclaimer, the term of this patent is extended or adjusted under 35 U.S.C. 154(b) by 0 days.

(21) Appl. No.: 16/073,215

(22) PCT Filed: Nov. 16, 2016

(86) PCT No.: PCT/KR2016/013179
§ 371 (c)(1),
(2) Date: Jul. 26, 2018

(87) PCT Pub. No.: WO2017/131329
PCT Pub. Date: Aug. 3, 2017

(65) Prior Publication Data
US 2019/0032876 A1 Jan. 31, 2019

(30) Foreign Application Priority Data
Jan. 27, 2016 (KR) .......... 10-2016-0009859

(51) Int. Cl.
*F21L 4/00* (2006.01)
*F21S 9/02* (2006.01)
(Continued)

(52) U.S. Cl.
CPC ............ *F21S 9/02* (2013.01); *F21S 10/02* (2013.01); *F21V 19/02* (2013.01); *F21V 23/02* (2013.01);
(Continued)

(58) Field of Classification Search
CPC .... F21S 9/02; F21S 10/02; H02J 7/025; H02J 7/02; F21V 19/02; F21V 23/02;
(Continued)

(56) References Cited

U.S. PATENT DOCUMENTS

2009/0098432 A1  4/2009 Rosenberg et al.
2015/0300581 A1* 10/2015 Huang .............. F21L 4/00
                                                    362/86

FOREIGN PATENT DOCUMENTS

JP       2008204855 A  *  9/2008
KR   10-2012-0084411 A     7/2012
(Continued)

OTHER PUBLICATIONS

Screen capture from YouTube, Video 1 entitled "Qi Wireless Charging for iPhone", uploaded on Jul. 6, 2015 by user " Paulsbackyardstuff". Retrieved from Internet: <https://youtu.be/pOciL7lDgBw>; See attached clip image of Video 1. (Year: 2015).*

(Continued)

*Primary Examiner* — William J Carter
*Assistant Examiner* — Omar Rojas Cadima
(74) *Attorney, Agent, or Firm* — Maschoff Brennan

(57) ABSTRACT

A lighting lamp device has an LED provided therein to light up the surroundings and cause an induced current flow in a battery built in an electronic device disposed at an upper end thereof, to charge the battery. The lighting lamp device includes a main body made of a transparent or translucent material of which the top and bottom are open; a cover coupled to the opened upper end of the main body, forming a wireless charging zone in which a battery built in an electronic device disposed on the upper end can be charged; and a support plate coupled to the opened lower end of the main body, and embedded therein, a power supply means and a printed circuit board having a plurality of LEDs for receiving power from the power supply means and emitting light at the upper surface of the printed circuit board.

5 Claims, 3 Drawing Sheets

(51) Int. Cl.
| | |
|---|---|
| *F21S 10/02* | (2006.01) |
| *F21V 23/02* | (2006.01) |
| *H05B 37/02* | (2006.01) |
| *F21V 19/02* | (2006.01) |
| *F21Y 115/10* | (2016.01) |
| *H02J 7/02* | (2016.01) |

(52) U.S. Cl.
CPC .......... *H05B 37/02* (2013.01); *F21Y 2115/10* (2016.08); *H02J 7/025* (2013.01)

(58) Field of Classification Search
CPC ......... F21V 23/00; F21V 19/00; H05B 37/02; F21Y 2115/10
See application file for complete search history.

(56) References Cited

FOREIGN PATENT DOCUMENTS

| | | |
|---|---|---|
| KR | 2014-0103457 A | 8/2014 |
| KR | 20-2015-0000362 | 1/2015 |
| KR | 2015-0046567 A | 4/2015 |
| KR | 2015-0111217 A | 10/2015 |

OTHER PUBLICATIONS

Screen capture from YouTube, Video 2 entitled "What's Inside Fantasy Wireless Charger", uploaded on May 14, 2018 by user "Pramod S". retrieved from Internet: <https://youtu.be/KxQhRnQ-XMY> See attached clip image of Video 2. (Year: 2018).*
Spacenet English translation of JP-2008204855-A (Year: 2008).*

* cited by examiner

LIGHTING LAMP DEVICE

TECHNICAL FIELD

The present invention relates to a lighting lamp device and, more particularly, to a lighting lamp device, which has LEDs provided therein so as to light up the surroundings and causes an induced current flow in a battery built in an electronic device disposed on the lighting lamp device so as to charge the battery.

BACKGROUND ART

In recent years, folk remedies have been widely used in fatigue recovery, beauty, and the recovery of human injuries, and these folk remedies are called the third medicine, which is also called alternative medicine in addition to traditional oriental medicine and western medicine.

The alternative medicine is classified into various kinds such as psychosomatic medicine, herbal medicine, diet therapy, nutritional therapy, biochemotherapy, hand therapy, alternative medical physical therapy, magnetic therapy, acupuncture, natural medicine, diagnosis and the like. Among these, chromotherapy is applied to the hand therapy, color therapy, colon therapy, cupping and the like, which belongs to the alternative medical physical therapy, wherein it has been scientifically confirmed that light affects humans, plants and animals in a form of energy according to the inherent wavelengths and frequencies of colors and thus therapeutic methods have been developed that apply the light to healthcare and therapy.

In color therapy, each color has a unique wavelength and frequency and exhibits various effects on human bodies. For example, red color releases congestion and activates the blood circulation, vermilion reduces the irritation or inflammation in the brain and arouses energy in the kidneys, green has strong therapeutic effects on the sympathetic nervous system to help the liver function and has a strong detoxifying action against pollutants, and blue as a color that calms the mind has an effect on insomnia and is also effective on asthma or respiratory diseases, muscle atrophy, digestive disorders, ulcers, thyroid dysfunction, lethargy and the like. When treating diabetes, it is known that by simply observing the orange color often, the insulin dose can be lowered.

In addition, purple has an appetite control action and thus helps to treat obesity and also has the function of relaxing cardiac activity, pink has more effect on the mental side rather than the body and increases the vibration of the body to give vitality, yellow is effective for cold treatment because it has the property of eliminating mucus secretion, and magenta that is the combination of red and purple, is known to eliminate headaches and migraines and to provide love, sympathy, and tolerance.

Korean Patent Laid-Open Publication No. 10-2012-0084411 discloses "a light for color therapy", in which colors for color therapy can be felt through the front surface of a body by surface light emission so that the color therapy effect can be obtained, and which is very easy and free to use in terms of interior decoration.

However, such a color therapy light has a limitation that it exerts a simple visual action effect because it just emits light.

In order to solve such a problem, recently, a lighting device is required which has not only a simple visual function but also a useful function in real life.

DISCLOSURE

Technical Problem

The present invention has been made in view of the above circumstances and has an objective to provide a lighting lamp device, which has, together with the simple visual effects as well as physiological and emotional effects through emitted light, the function of wirelessly charging an electronic device such as a smart phone that is always carried and in use in everyday life.

Technical Solution

A lighting lamp device, according to the present invention, comprises: a main body made of a transparent or translucent material and of which the top and bottom are opened; a cover coupled to the opened upper end of the main body, and forming a wireless charging zone in which a battery built in an electronic device disposed on the upper end can be charged; and a support plate coupled to the opened lower end of the main body, and having, embedded therein, a power supply means for supplying power and a printed circuit board having a plurality of LEDs for receiving power from the power supply means and emitting light at the upper surface of the printed circuit board.

The cover includes: a coupling part coupled to the main body by rotationally fitting the coupling part to an upper end portion on the inside of the main body; and a charging part coupled to the upper end of the coupling part and charging the battery built in the electronic device disposed on the upper end by inducing an induction current in the battery by any one method of electromagnetic induction, magnetic resonance or electromagnetic wave methods.

The support plate has the power supply means arranged on the lower end portion therein and the printed circuit board disposed at a position spaced apart in the upward direction from the position where the power supply means is disposed, wherein the power supply means and the printed circuit board are electrically connected to each other via a first cable.

Herein, a through hole is formed in the center of the printed circuit board, and the power supply means and the charging part are electrically connected to each other through a second cable in such a manner that the second cable passes through the through hole formed in the center of the printed circuit board and is installed vertically along height direction.

The lighting lamp device according to the present invention may further comprise a remote control unit additionally provided for transmitting a control command signal.

Herein, the remote control unit includes: an on-off button for enabling the LEDs to light or blink; an adjustment button for adjusting brightness or saturation of the light of the LEDs which are in the lit state; a color conversion button for changing the color of the light emitted from the LEDs at regular intervals; and an automatic blink button for enabling the LEDs, which are in the lit state, to blink at a preset time.

The printed circuit board integrally includes: a signal transmitting and receiving member for receiving a control command signal from the remote control unit; and a control chip for receiving a signal from the signal transmitting and receiving member so as to carry out control such that the LEDs light or blink according to the received control command signal, the brightness or saturation is adjusted while the LEDs are in the lit state, the color of the light emitted from the LEDs is changed at regular intervals, or the LEDs, which are in the lit state, blink at the preset time.

Meanwhile, the support plate has a connection port formed in the outer circumferential surface of the support plate and into which a connection mechanism connected to electric wiring is inserted such that a power supply means built in the support plate can be charged.

Advantageous Effects

According to the lighting lamp device of the present invention, light of various colors is emitted from the LEDs provided inside the main body and lighting the surroundings and transmitted to the cerebrums through the optic nerves of the people, who receive the emitted light, thereby exhibiting the effect of managing the psychological roles of stimulation, liveliness, relaxation, calming and the like.

In addition, according to the lighting lamp device of the present invention, a charging part for forming a wireless charging zone is provided such that an induced current is generated in a battery built in an electronic device disposed at an upper end, thereby charging the battery.

Figure 1:
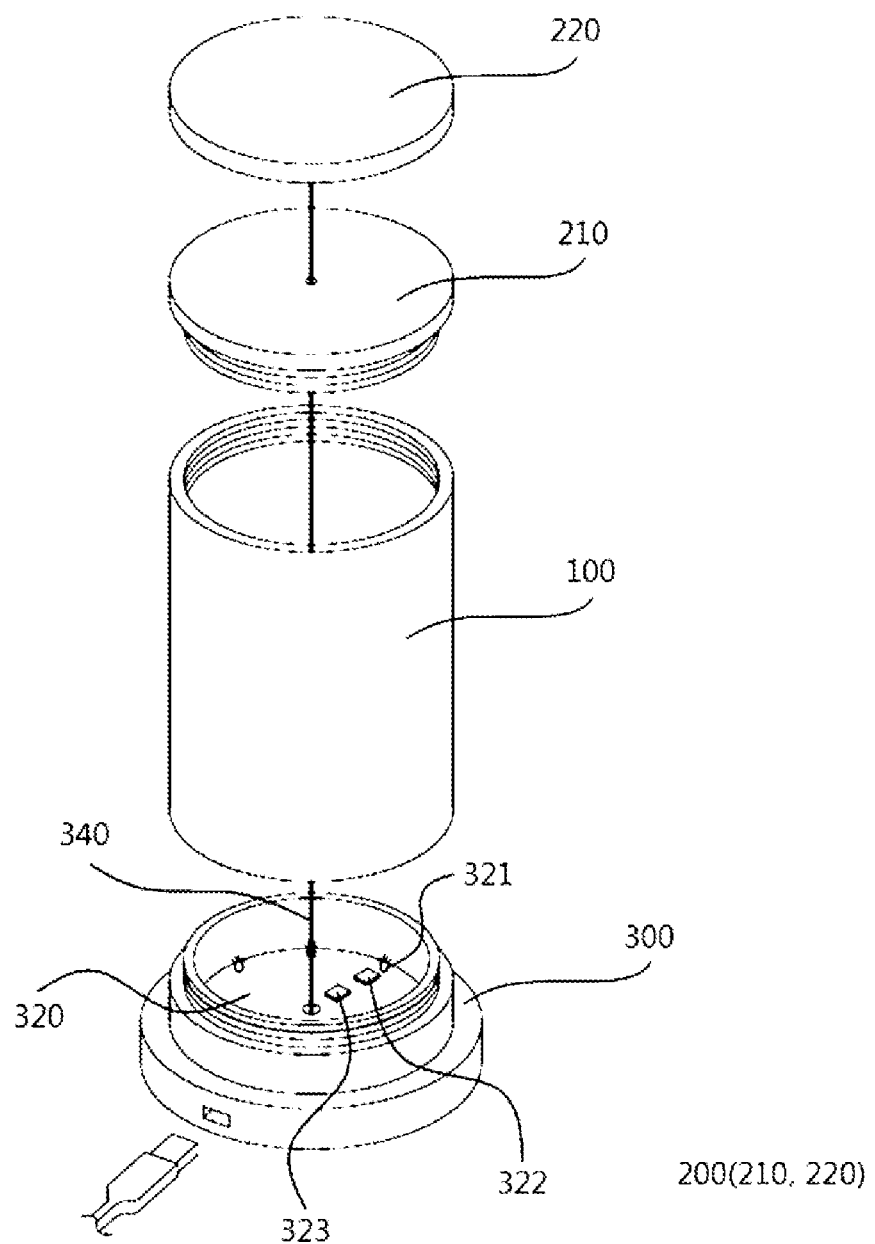
FIG. 1 is an exploded perspective view illustrating a state where a main body, a cover, and a support plate of a lighting lamp device according to an embodiment of the present invention are disassembled.

| Brief Explanation of Reference Symbols | |
| --- | --- |
| 100: main body | 200: cover |
| 210: coupling part | 220: charging part |
| 300: support plate | 300a: connection port |
| 300b: stepped part | 310: power supply means |
| 320: printed circuit board | 320a: through hole |
| 321: LED | |
| 322: signal transmitting and receiving member | |
| 323: control chip | 330: first cable |
| 340: second cable | 400: remote control unit |
| 410: on-off button | 420: adjustment button |
| 430: color conversion button | 440: automatic blink button |

BEST MODE FOR CARRYING OUT THE DISCLOSURE

Hereinafter, an embodiment of the present invention will be described in more detail with reference to the accompanying drawings. It should be understood, however, that the present invention will not be limited to the disclosed embodiments, but may be embodied in many different forms. These embodiments are provided so that this disclosure will be thorough and complete and to fully convey the scope of the invention to those skilled in the art. In the drawings, like reference numerals refer to like elements.

Figure 2:
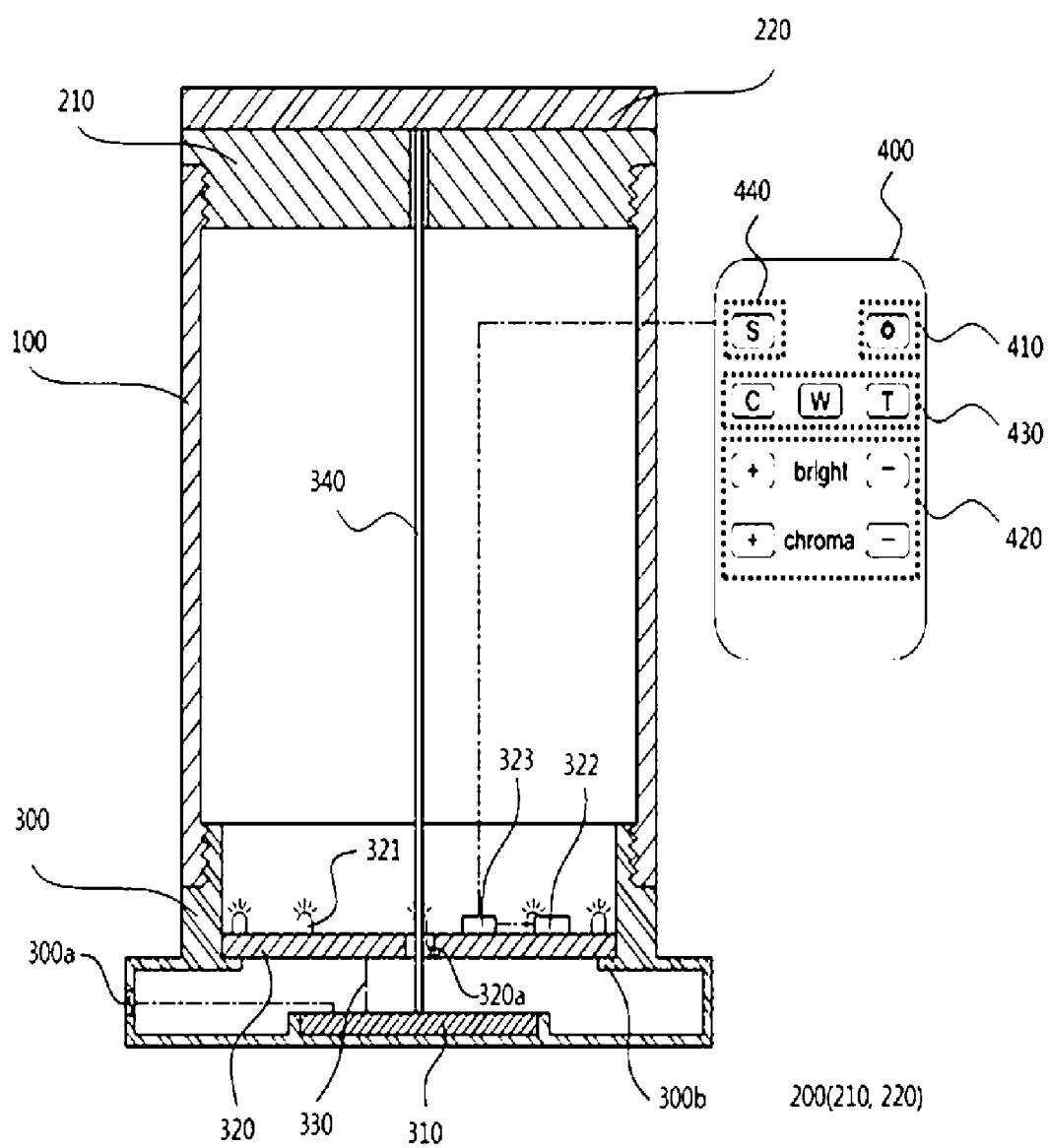
FIG. 2 is a cross-sectional view illustrating a lighting lamp device according to an embodiment of the present invention.
Figure 3:
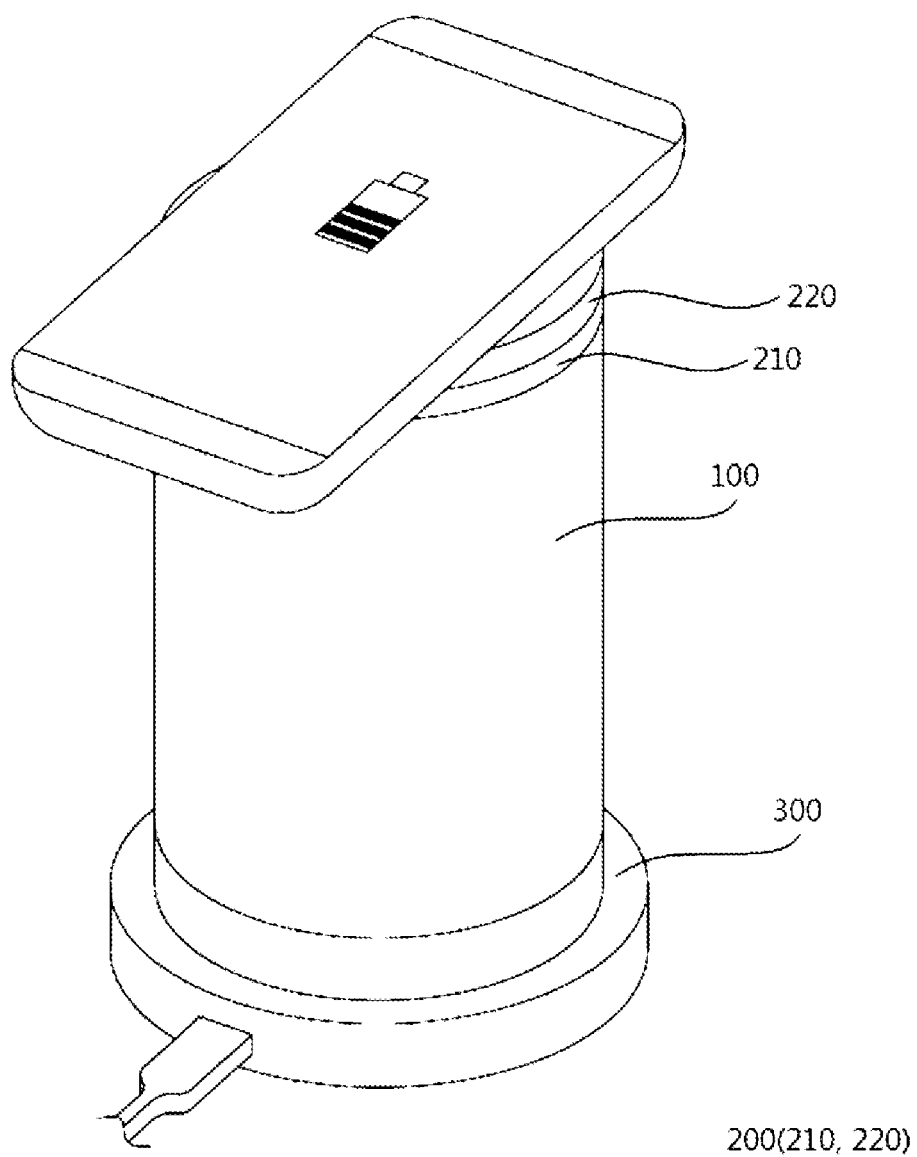
FIG. 3 is an operational state diagram illustrating an operating state of a lighting lamp device according to an embodiment of the present invention.

FIG. 1 is an exploded perspective view illustrating a state where a main body, a cover, and a support plate of a lighting lamp device according to an embodiment of the present invention are disassembled, FIG. 2 is a cross-sectional view illustrating a lighting lamp device according to an embodiment of the present invention, and FIG. 3 is an operational state diagram illustrating an operating state of a lighting lamp device according to an embodiment of the present invention.

As shown in FIG. 1 to FIG. 3, the present invention relates to a lighting lamp device, which has, together with the simple visual effects as well as physiological and emotional effects through emitted light, the function of wirelessly charging an electronic device such as a smart phone that is always carried and in use in everyday life, and includes a main body 100, of which the top and bottom are opened, a cover 200 coupled to the opened upper end of the main body 100, and a support plate 300 coupled to the opened lower end of the main body 100.

The main body 100 is made of a transparent or translucent material with the opened top and bottom portions and a hollow inside such that the light emitted from the hollow inside can be transmitted.

In particular, even though the main body 100 is implemented in a cylindrical shape in an embodiment of the present invention, the main body 100 is not limited thereto and may be implemented in the shape of a polygonal prism such as a triangular prism or a quadrangular prism.

In addition, in order to rotationally fitting the cover 200 so as to couple the cover 200, it is preferable that a fitting element is formed at the upper end portion on the inside of the main body 100 or a thread is formed along the periphery of the upper end portion on the inside of the main body 100.

Similarly, in order to rotationally fitting the support plate 300 so as to couple the support plate 300, it is preferable that a fitting element is also formed at the lower end portion on the inside of the main body 100 or a thread is formed along the periphery of the lower end portion on the inside of the main body 100.

The cover 200 is a means for charging a battery built in an electronic device disposed at its upper end and includes a coupling part 210 coupled to the main body 100 by rotationally fitting the coupling part 210 to the upper end portion on the inside of the main body 100, and a charging part 220 coupled to the upper end of the coupling part 210.

The coupling part 210 has a periphery corresponding to the periphery of the main body 100 and has a plate shape as a whole.

In particular, when the fitting element is formed at the upper end portion on the inside of the main body 100, it is preferable that a fitting groove is formed at the lower end portion on the outside of the coupling part 210 so that the fitting element can be inserted. Also, when the thread is formed along the periphery of the upper end portion on the inside of the main body 100, it is preferable that a corresponding thread is formed along the periphery of the lower end portion on the outside of the coupling part 210 so that the thread of the main body 100 can be screw-coupled to the corresponding thread of the coupling part 210.

The charging part 220 has a periphery corresponding to the periphery of the coupling part 210, and is integrally coupled to the upper end of the coupling part 210.

The upper end of the charging part 220 is to be a wireless charging zone (wireless power transfer zone), where a battery built in an electronic device such as a smart phone is charged, wherein it is preferable that the text "Put your smart phone on and it will be charged" should be indicated so that it can be visually recognized by a user who wants to charge the electronic device such as a smart phone.

The charging part 220 charges the battery built in the electronic device such as a smart phone placed on the wireless charging zone by inducing an induction current according to any one method of an electromagnetic induction method using an induction phenomenon between primary and secondary coils of a transformer, a magnetic resonance method using a resonance phenomenon between transmitting and receiving antennas, and an electromagnetic wave method for directly transmitting and receiving electromagnetic waves through antennas.

As shown in FIG. 1 and FIG. 2, the support plate 300 includes a power supply means 310 for supplying power and a printed circuit board 320 having a plurality of LEDs 321 provided on the upper surface thereof so as to receive power from the power supply means 310 and to emit light, wherein the support plate 300 is coupled to the opened lower end of the main body 100.

The support plate 300 has a periphery corresponding to the periphery of the main body 100 and has a plate shape as a whole.

In particular, when the fitting element is formed at the lower end portion on the inside of the main body 100, it is preferable that a fitting groove is formed at the upper end portion on the inside of the support plate 300 so that the fitting element can be inserted. Also, when the thread is formed along the periphery of the lower end portion on the inside of the main body 100, it is preferable that a corresponding thread is formed along the periphery of the upper end portion on the outside of the support plate 300 so that the thread of the main body 100 can be screw-coupled to the corresponding thread of the support plate 300.

The power supply means 310 is a rechargeable battery capable of recovering voltage by introducing the discharged current again from the outside, electrically connected to the printed circuit board 320 and the charging part 220, respectively and disposed at the lower end portion on the inside of the support plate 300.

The printed circuit board 320 is an insulating substrate for forming a conductor circuit on the surface of the substrate so as to connect components based on a circuit design, and disposed at a position spaced apart from the position where the power supply means 310 is disposed.

To this end, it is preferable that a stepped part 300b protruding inwardly is mounted on the inner periphery of the support plate 300 so that the printed circuit board 320 can be seated thereon.

Meanwhile, the power supply means 310 and the printed circuit board 320 are electrically connected through a first cable 330, and the power supply means 310 and the charging part 220 are electrically connected through a second cable 340.

Herein, the second cable 340 passes through the through hole 320a formed in the center of the printed circuit board 320 and is extended vertically along height direction so as to be connected to the charging part 220, such that interference does not occur to the light emitted from the plurality of LEDs 321 provided on the upper surface of the printed circuit board 320.

Meanwhile, a connection port 300a is formed in the outer circumferential surface of the support plate 300 such that a connection mechanism connected to electric wiring is inserted into the connection port 300a so as to charge the power supply means 310 built in the support plate 300 or to be supplied with power from the power supply means 310.

That is, the connection mechanism, to which electric wiring is connected to introduce the discharged current back into the power supply means 310 from the outside, is inserted into the connection port 300a, and thus the connection port 300a may be implemented in a form, in which various types of connection mechanisms, for example, a micoUSB, a lightning cable port and the like can be inserted, wherein the connection port 300a may be implemented in any form if the power supply means 310 can be charged or if power can be supplied from the power supply means 310.

In addition, It is conceivable that a plurality of status display LEDs are provided to allow a user to identify the remaining capacity of the rechargeable battery, that is, the power supply means 310, from the outside.

For example, in the case where four status display LEDs are provided, if the remaining capacity of the rechargeable battery that is the power supply means 310 is 100%, the four status display LEDs are all turned on, if the remaining capacity of the rechargeable battery that is the power supply means 310 is 75 to 99%, three of the status display LEDs are turned on and the other one status display LED blinks, if the remaining capacity of the rechargeable battery that is the power supply means 310 is 50 to 74%, two of the status display LEDs are turned on and the other two status display LEDs blink, if the remaining capacity of the rechargeable battery that is the power supply means 310 is 25 to 49%, one of the status display LEDs is turned on and the other three status display LEDs blink, and if the remaining capacity of the rechargeable battery that is the power supply means 310 is 0 to 24%, all the four status display LEDs blink. Therefore, the user can identify the remaining capacity of the rechargeable battery that is the power supply means 310 from the outside.

The lighting lamp device according to the present invention further includes a remote control unit 400 separately provided for transmitting a control command signal.

The remote control unit 400 is a means for controlling the LEDs provided on the upper surface of the printed circuit board 320 at a distance and is similar to a remote controller overall.

The remote control unit 400 includes an on-off button 410 for lighting or blinking the LEDs, an adjustment button 420 for adjusting the brightness or saturation of the light emitted by the LEDs which are in the lit state, a color conversion button 430 for changing the color of the light emitted from the LEDs, and an automatic blink button 40 for blinking the LEDs in the lit state at a preset time.

It is preferable that the remote control unit 400 incorporates a printed circuit board designed to transmit a control command signal that enables the function of a corresponding button to be implemented, when the on-off button 410, the adjustment button 420, the color conversion button 430 or the automatic blink button 440 is pressed.

In addition, the remote control unit 400 may include three color conversion buttons 430 respectively marked with "C", "W" and "T", wherein lights of different colors are respectively emitted from the plurality of LEDs 321 when the color conversion button 430 marked with "C" is pressed, white light is emitted from the LEDs 321 when the color conversion button 430 marked with "W" is pressed, and light of a different color is emitted at regular intervals when the color conversion button 430 marked with "T" is pressed.

Even though an embodiment of the present invention has been implemented so that the color of light can be manually selected using the color conversion buttons 430, but the present invention is not limited thereto. It is also possible to implement automatic conversion of the color suitable for healing on the basis of bio-diagnosis information transmitted from wearable devices, such as watches, glasses, clothes, and helmets, which are used in everyday life, incorporating IT technologies such as flexible display, smart sensors, low-power wireless communications, and mobile operating systems, which are compatible with the lighting lamp device according to the present invention.

In addition, the remote control unit 400 may include four adjustment buttons 430, of which two buttons are marked with "+" and the other two buttons are marked with "−", wherein the two buttons having the mark "+" are to increase the brightness and the saturation of the light emitted from the LEDs 321 when pressed, while the other two buttons having the mark "−" are to decrease the brightness and the saturation of the light emitted from the LEDs 321 when pressed.

Furthermore, the printed circuit board 320 includes a signal transmitting and receiving member 322 for receiving a control command signal from the remote control unit and transmitting the received control signal, and a control chip 323 for receiving the control command signal transmitted from the signal transmitting and receiving member 322 and carrying out control according to the received control command signal such that the LEDs 321 may light or blink, the brightness or the saturation may be adjusted while the LEDs 321 are lit, the color of the light emitted from the LEDs 321 may be changed at regular intervals, or the LEDs 321 may blink at a preset time.

The signal transmitting and receiving member 322 is hardware such as Bluetooth, radio frequency identification RFID, or the like which enables wireless transmission and reception, and may be used in various ways without limitation to the above-described method, as long as it enables wireless transmission and reception.

The lighting lamp device according to the present invention may incorporate or be equipped with an additional anion generator to provide the effects of purifying the blood through the progress of the alkalization by increasing the ionization rate of the user, generating endorphins and enkephalins so as to promote fatigue recovery and physical strength recovery, and activating the cells in the area where the pain was present so as to relieve the pain.

In addition, if the lighting lamp device according to the present invention includes a general-purpose voice receiver or a micro-voice receiver having a USB terminal detachable from the connection port 300a, the above-described operations can be controlled according to a voice signal through voice recognition.

Although the present invention has been described with reference to the accompanying drawings and the preferred embodiments described above, the present invention is not limited thereto but is defined by the following claims. Accordingly, a person skilled in the art will appreciate that various modifications and alterations may be made to the present invention without departing from the spirit of the following claims.

INDUSTRIAL APPLICABILITY

The lighting lamp device according to the present invention has the LEDs installed inside the main body so as to emit the light of various colors from the LEDs that illuminate the surroundings such that the light may be transmitted to the cerebrums through the optic nerves of the people who have received the emitted light and thus manage the psychological roles of stimulation, refreshing, relaxation, sedative effects and the like. Furthermore, by providing a charging part forming the wireless charging zone, the lighting lamp device according to the present invention can cause the current induced in the built in battery of an electronic device disposed on the lighting lamp device so as to charge the battery.

The lighting lamp device according to the present invention may include a general-purpose voice receiver or a micro-voice receiver having a USB terminal detachable from the connection port 300a such that the lighting or blinking time and the like of the light as well as the color conversion of the light can be controlled by voice recognition through, for example, Google Home or Amazon Echo that has wireless capabilities.

The invention claimed is:

1. A lighting lamp device comprising:
   a main body made of a transparent or translucent material and of which the top and bottom are opened;
   a cover coupled to an opened upper end of the main body, and forming a wireless charging zone in which a battery built in an electronic device disposed on the opened upper end can be charged; and
   a support plate coupled to an opened lower end of the main body, and having, embedded therein, a power supply means for supplying power and a printed circuit board having a plurality of LEDs for receiving power from the power supply means and emitting light at an upper surface of the printed circuit board,
   wherein the support plate has the power supply means arranged on a lower end portion therein and the printed circuit board disposed at a position spaced apart in an upward direction from a position where the power supply means is disposed, the power supply means and the printed circuit board being electrically connected to each other via a first cable, and
   wherein a through hole is formed in a center of the printed circuit board, and the power supply means and a charging part are electrically connected to each other through a second cable in such a manner that the second cable passes through the through hole formed in the center of the printed circuit board and is installed vertically along height direction.

2. The lighting lamp device according to claim 1, wherein the cover includes:
   a coupling part coupled to the main body by rotationally fitting the coupling part to an upper end portion on the inside of the main body; and
   the charging part coupled to an upper end of the coupling part and charging the battery built in the electronic device disposed on the upper end by inducing an induction current in the battery by any one method of electromagnetic induction, magnetic resonance or electromagnetic wave methods.

3. The lighting lamp device according to claim 1, further comprising a remote control unit additionally provided for transmitting a control command signal, wherein the remote control unit includes:
   an on-off button for enabling the LEDs to light or blink;
   an adjustment button for adjusting brightness or saturation while the LEDs are in the lit state;
   a color conversion button for changing the color of the light emitted from the LEDs at regular intervals; and
   an automatic blink button for enabling the LEDs, which are in the lit state, to blink at a preset time.

4. The lighting lamp device according to claim 3, wherein the printed circuit board integrally includes:
   a signal transmitting and receiving member for receiving a control command signal from the remote control unit; and
   a control chip for receiving a signal from the signal transmitting and receiving member so as to carry out control such that the LEDs light or blink according to the received control command signal, the brightness or saturation is adjusted while the LEDs are in the lit state, the color of the light emitted from the LEDs is changed at regular intervals, or the LEDs, which are in the lit state, blink at the preset time.

5. The lighting lamp device according to claim 1, wherein the support plate has a connection port formed in an outer circumferential surface of the support plate and into which a connection mechanism connected to electric wiring is inserted such that the power supply means built in the support plate can be charged.

* * * * *